United States Patent [19]

Rentschler et al.

[11] 4,012,752
[45] Mar. 15, 1977

[54] SLIT SHUTTER FOR A CAMERA

[75] Inventors: Waldemar T. Rentschler; Walter Holzapfel, both of Calmbach, Black Forest, Germany

[73] Assignee: Prontor-Werk Alfred Gauthier GmbH, Wildbad, Black Forest, Germany

[22] Filed: Jan. 15, 1976

[21] Appl. No.: 649,396

Related U.S. Application Data

[63] Continuation of Ser. No. 416,220, Nov. 15, 1973, abandoned, which is a continuation of Ser. No. 573,839, May 2, 1975, abandoned.

[30] Foreign Application Priority Data

Nov. 15, 1972 Germany .................. 2255835

[52] U.S. Cl. .................. 354/242; 354/243; 354/249
[51] Int. Cl.² .................. G03B 9/32
[58] Field of Search .......... 354/241, 242, 243, 244, 354/245, 246, 247, 248, 249

[56] References Cited

UNITED STATES PATENTS 3,006,263  10/1961  Elliot et al. .................. 354/243

FOREIGN PATENTS OR APPLICATIONS 14,839  8/1893  United Kingdom .......... 354/243
141,750  4/1960  U.S.S.R. .................. 354/241

Primary Examiner—Russell E. Adams, Jr.
Attorney, Agent, or Firm—Arthur A. March

[57] ABSTRACT

This invention is directed to a slit shutter type of photographic camera which provides one cover system which would uncover the normal camera image window and another cover system following the first in operation after a selected and suitable time delay which will cover the window again. Each of the cover systems includes a folding blind and a means to fix the blind at one end and a rigid rail means connected at the other end to form one edge of the slit. There is also means to displace the rail along a substantially straight line.

6 Claims, 4 Drawing Figures

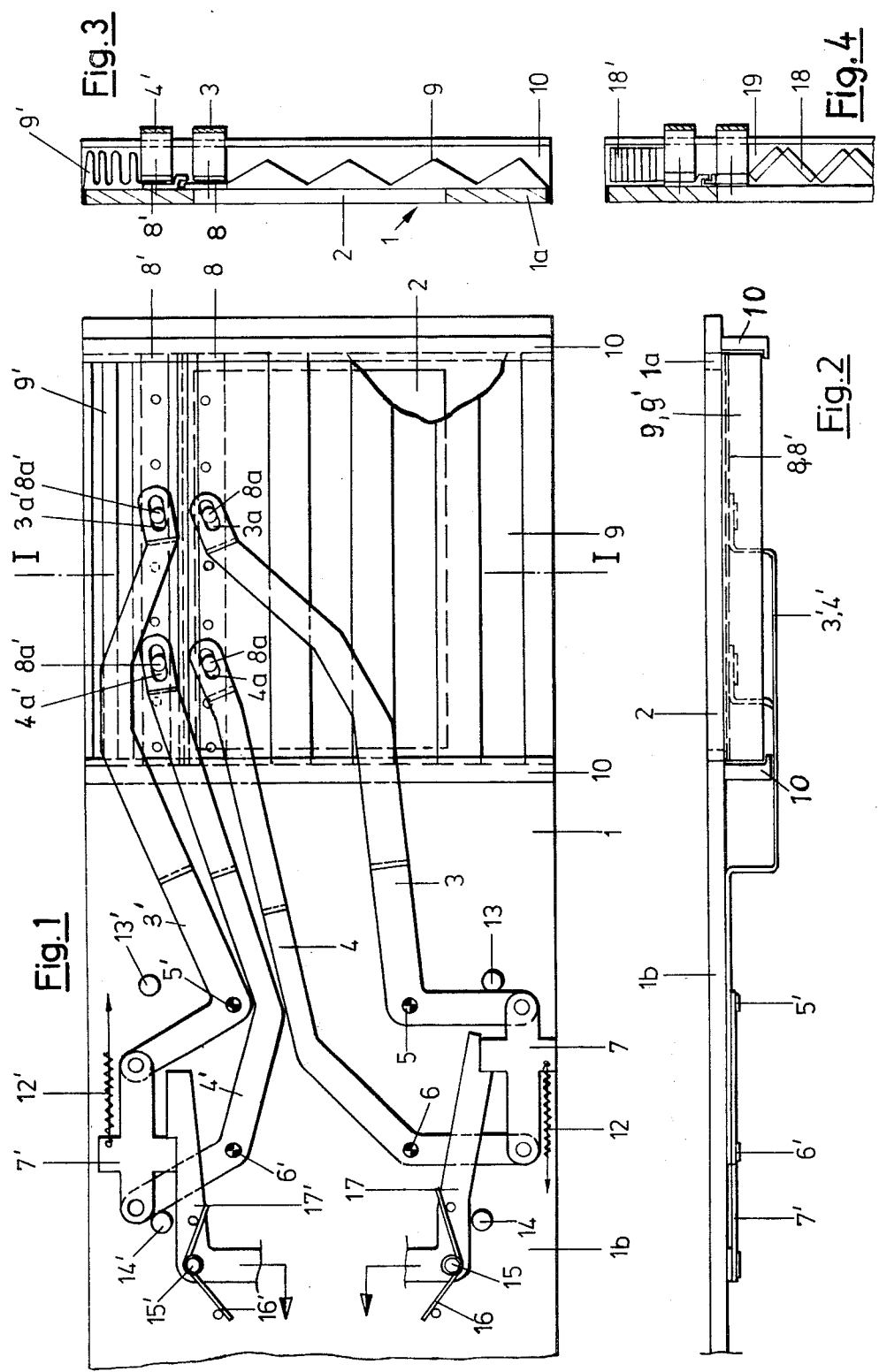

SLIT SHUTTER FOR A CAMERA

This is a continuation of corresponding copending U.S. applications Ser. No. 416,220, filed Nov. 15, 1973 and Ser. No. 573,839, filed May 2, 1975, respectively, both now abandoned.

BACKGROUND OF THE INVENTION of

The present invention relates to a slit shutter device for a camera. It comprises a first cover system which uncovers the usual image window during an exposure, and another cover system operating this system after a time delay to close the window again.

Slit shutters of this general type are known in many different embodiments. One type of shutter was provided with cover systems with cloth rolls; but when the disadvantages of such roller blinds were recognized, slit shutters were developed, the cover systems of which include a plurality of slides associated with each other for relative movement. Conventional slit shutters of this type have the disadvantage, however, that the slides cannot be rapidly accelerated because of their weight and size, so that shutter speeds of the type required, for example, for making day-light exposures of extremely rapidly moved objects, or electronic flash-light exposures, cannot be achieved. Another disadvantage of these slit shutter arrangements is that they require a relatively large amount of space, with the result that difficulties of design arise, particularly with vertically operating shutter members.

The main object of the present invention is to produce a slit shutter for a photographic camera. Such a shutter comprises one cover system uncovering the image window during exposure and another cover system following the first system after a selectable time delay for covering the window again. Each of the two cover systems includes a folding blind, which is fixed at one end and is connected at the other end to a rigid rail forming one edge of the slit and displaceable along a straight line.

A particular advantage of this invention is that only relatively small masses have to be accelerated during an exposure since the cover system from an extended condition folds together, and in the folded condition needs only to be extended, so that it is only necessary to move a mass progressively diminishing from a maximum value. In addition, it has been possible to dispense with complicated guide members which are unavoidable in conventional slit shutter arrangements, and consequently there is a considerable reduction of parts.

According to a preferred embodiment of the invention, the folding blinds are formed of a buckle-proof flexible material, such as a cloth provided with a rubber layer. According to a further feature of the invention, a folding blind consists of identical strip-like members articulated together.

In order to prevent the entry of light and curling-up of the curtain during the folding operation, it is also proposed in accordance with the present invention that the folding blinds may be located between plates, the depth of which is approximately the width of the blind in the folded-up condition. The plates are preferably of L-shaped section and enclose the edges of the folding blinds. Preferably displaceable rails provided for each cover system form the edges of the slit, and are connected to the ends of links of a parallel linkage.

The invention is described in greater detail hereinafter and is illustrated in the drawings, in which:

FIG. 1 shows a slit shutter, the cover systems uncovering the image window and covering it again being shown in the basic position they assume before each exposure;

FIG. 2 shows a side view of FIG. 1;

FIG. 3 shows a section through the shutter taken on the line I—I of FIG. 1; and

FIG. 4 shows a partial view of a folding blind, consisting of strip-like members connected together by hinges.

In FIG. 1, a baseplate 1 of the slit shutter comprises a portion 1a in which there is an image window 2, and another portion 1b in which a plurality of guiding and driving members for two cover systems described in greater detail hereinafter, for uncovering the image window 2 during an exposure and covering it again, are mounted to rotate about fixed pivots. The two arrangements are mirror-symmetrical.

Each of these driving members comprises two links or levers 3 – 4 and 3' – 4' respectively, which have two arms and are journalled to rotate on pins 5 – 6 and 5' – 6', respectively. The two link pairs 3 – 4 and 3' – 4' are constructed as parallel linkages and are connected together in driving engagement at one end by means of couplings 7 – 7', respectively, and are provided at their other ends with respective rails 8 – 8'. The connection of the rails 8 – 8' to the particular pair of links is affected by pin- and- slot connections 3a – 8a and 4a – 8a or 3a' – 8a' and 4a' – 8a', in such manner that the links and cover systems can move transversely to the direction of movement of the camera film. A folding blind or curtain 9 – 9' made of rubberised cloth, plastics material or the like and secured in position at the other end to the baseplate 1, is fixed to each plate 8 – 8', respectively. The arrangement and the association of the two cover systems each formed of a plate 8 – 8' and a folding curtain or blind 9 and 9' is such that one blind covers the image window when in the unfolded condition in dependence on the position of the parallel linkage, or uncovers the window in the folded condition; one cover system, as is normal in the case of slit shutters, follows the other cover system after a time lag, which, regulated by a control device, changes over from an uncovered condition of the film, to a covered condition.

According to the embodiment shown in FIGS. 1 to 3, the folding blinds, 9 – 9' consist of a rubberised cloth which is initially folded so that it can be readily drawn out and is easily folded together again, each such cover system thereby constituting an elongated bellows-like type of screen. In order to prevent any lateral curling of the blind out of the actual plane of movement and hence to prevent any entry of light around the sides of the image window, both sides of the folding blind are provided with plates 10 which have an L-shaped section and they engage around the edge portions of the blind, as may be seen in particular from FIG. 2. From this figure it may also be perceived that the links 3 – 4 or 3' – 4' extend over one of the guide plates 10 and are hinged to the rail 8 and 8' serving for the suspension of the particular folding blind 9 and 9'.

As already stated, the two links 3 – 4 or 3' – 4' are pivotably connected together at one end by means of couplings 7 and 7' and are in driving engagement with each other. An operating force means indicated in the drawings by a spring 12 – 12' respectively acts on the particular coupling in such manner that this force exerts a torque in a clockwise direction, about the fixed bearing points 5 – 6 or 5' – 6', respectively thereof, on each of the parallel linkages. In order to limit the particular angle of rotation of the parallel linkages, fixed pins 13 – 14 or 13' – 14' are provided. Locking and release pawls 17 – 17' mounted to rotate on fixed pins 15 – 15' respectively, each have two arms and are subjected to the bias of springs 16 – 16', and cooperate with the couplings 7 – 7'. The pawls 17 – 17' lock their respective linkages against their spring tensions, and are thus able to keep the particular cover system 9 – 9' in the basic position assumed before each exposure.

As shown alternatively in FIG. 4, the folding blinds may consist of rigid, strip-like members 18 – 18' which are connected together by means of strips of flexible material in such manner that they can be folded together into a very small space and, in the unfolded condition, provide a light-proof cover for the image window 2. Each such corresponding cover system similarly constitutes an elongated bellows-like type of screen. In the same manner as in the embodiment shown in FIGS. 1 – 3, plates 19 are arranged on both sides of the folding blind for guiding purposes and to prevent entry of light around the sides of the shutter. In addition, the links serving to move each folding blind are so designed that they extend over the plates and are brought into driving engagement with one of the rails 18 – 18' of each blind serving to form the edges of the slit.

In the embodiment shown in FIGS. 1 to 3, the blind uncovering the image window during an exposure process, is indicated by 8–9. Movement of this blind is followed by the other blind 8' – 9' shown in the folded condition, after a time delay to cover the image window 2 again. For this purpose the pawl 17 is first actuated, this pawl releasing the parallel linkage 3–4 which is then moved by spring 12. After a certain time delay determined by a device (not shown) the release of the pawl 17' and that of the parallel linkage associated therewith takes place, after which the cover system 8' – 9' driven by the links 3' – 4' closes the image window 2 again. A device (not shown) in driving engagement with the pairs of links 3 – 4, and 3' – 4' is provided so that when the camera is cocked both cover systems 8 – 9 and 8' – 9' (or 18 – 18') return to the basic position shown in FIGS. 1 and 4 from the position they occupy after the exposure.

Thus, as is clear from the drawing, the links of each pair in effect provide a parallel bell crank lever linkage in which under the same spring action the short lever arms move through a comparatively short operative distance between the associated pair of limiting fixed pins while the corresponding long lever arms move through a pronouncedly longer distance for achieving slit shutter operation. Although both the short and long arms of the bell crank levers of each linkage will move simultaneously and through the same angle of rotation, the corresponding long lever arms will inherently move at a faster speed than the short arms due to the differential in their radial lengths.

What is claimed is:

1. Slit shutter for a photographic camera, comprising a base plate, a camera image window defined in said base plate and having opposed edges, a first cover system having a folding blind curtain for uncovering the image window for photographic exposure and a second cover system having a folding blind curtain adapted to function after the first cover system with a controlled time delay for again covering the image window, means to fix each blind curtain at one end thereof to a corresponding opposed edge of the image window, a rigid rail means connected at the other end of each blind curtain, said rail means together defining the corresponding edges of the associated slit of the cover system slit shutter, and means for positive displacement of the rail means along a substantially straight line including a pair of corresponding lever-containing parallel linkages pivotally supported on the base plate and having the ends of each linkage positioned displaceably for forming the corresponding edges of the slit of the cover system slit shutter.

2. Shutter according to claim 1 wherein the folding blind curtains are bellows-like folding blind curtains formed from strip-like rubber covered cloth forming a flexible material which is flexible in the folding direction.

3. Shutter according to claim 1 wherein the folding blind curtains are bellows-like folding blind curtains formed from rigid strip-like members which can be folded and unfolded at substantially equally spaced planes transversely of the shutter to produce a unit having the appearance of separate slats which are hinged together.

4. Shutter according to claim 1 wherein a pair of guide plates is provided adjacent to the image window and having a separation such that they operatively overlay the blind curtains to cover the side edges of the blind curtains in both the unfolded and folded condition.

5. Shutter according to claim 4 wherein the guide plates are in the form of L-shaped rails for operatively engaging the corresponding side edges of the folding blind curtains.

6. Shutter according to claim 1 wherein the lever-containing parallel linkages are spring-loaded bell crank lever linkages.

* * * * *